(12) United States Patent
Wu et al.

(10) Patent No.: US 12,366,845 B2
(45) Date of Patent: Jul. 22, 2025

(54) MATERIAL MANAGEMENT METHOD AND APPARATUS, COMPUTER DEVICE, AND STORAGE MEDIUM

(71) Applicant: CONTEMPORARY AMPEREX TECHNOLOGY (HONG KONG) LIMITED, Hong Kong (CN)

(72) Inventors: Xiaoyong Wu, Ningde (CN); Lei Song, Ningde (CN); Guangcheng Zhong, Ningde (CN); Yiyang Gong, Ningde (CN); Hongtao Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 195 days.

(21) Appl. No.: 18/346,818

(22) Filed: Jul. 4, 2023

(65) Prior Publication Data

US 2024/0152115 A1    May 9, 2024

Related U.S. Application Data

(63) Continuation of application No. PCT/CN2023/081127, filed on Mar. 13, 2023.

(30) Foreign Application Priority Data

Nov. 7, 2022    (CN) .......................... 202211386717.5

(51) Int. Cl.
  *G05B 19/4155*    (2006.01)
  *G06K 7/14*    (2006.01)

(52) U.S. Cl.
  CPC ....... *G05B 19/4155* (2013.01); *G06K 7/1413* (2013.01); *G06K 7/1417* (2013.01); *G05B 2219/32082* (2013.01)

(58) Field of Classification Search
  None
  See application file for complete search history.

(56) References Cited

U.S. PATENT DOCUMENTS

2005/0178840 A1    8/2005    Chang et al.

FOREIGN PATENT DOCUMENTS

| CN | 1011114965 A | 1/2008 |
|----|--------------|--------|
| CN | 107342984 A | 11/2017 |

(Continued)

OTHER PUBLICATIONS

State Intellectual Property Office of China Notice of Grant of Invention Patent Right for Application No. 202211386717.5 Aug. 24, 2023 6 pages (including translation).

(Continued)

*Primary Examiner* — Ryan A Jarrett
(74) *Attorney, Agent, or Firm* — ANOVA LAW GROUP, PLLC

(57) ABSTRACT

A material management method applied to a battery production line includes controlling, after a plurality of battery cells placed on a plurality of stations reach designated code scanning positions, a plurality of blocking devices to work in a first working state according to a predetermined sequence, thereby blocking identifications of the battery cells on the corresponding stations, acquiring code scanning results of a plurality of code scanning devices corresponding to the blocking devices for the identifications, respectively, when the blocking devices work in the first working state, and determining, according to the code scanning results, whether a binding relationship between the code scanning devices and the stations is abnormal.

9 Claims, 12 Drawing Sheets

(56) References Cited

FOREIGN PATENT DOCUMENTS

| | | |
|---|---|---|
| CN | 107704182 A | 2/2018 |
| CN | 110837877 A | 2/2020 |
| CN | 111507434 A | 8/2020 |
| CN | 213069837 U | 4/2021 |
| CN | 112990729 A | 6/2021 |
| CN | 113077221 A | 7/2021 |
| CN | 113407706 A | 9/2021 |
| CN | 113688965 A | 11/2021 |
| CN | 215100508 U | 12/2021 |
| CN | 113962234 A | 1/2022 |
| CN | 114192443 A | 3/2022 |
| CN | 114429146 A | 5/2022 |
| CN | 115270829 A | 11/2022 |
| DE | 102021214544 A1 | 8/2022 |

OTHER PUBLICATIONS

The World Intellectual Property Organization (WIPO) International Search Report for PCT/CN2023/081127 Jun. 23, 2023 5 pages (including English translation).

Qingqing Shi et al., "Step by step to realize quality intelligent control—Application research of radio frequency technology in quality intelligent control", China Quality, China Academic Journal Electronic Publishing House. pp. 12-15.

The China National Intellectual Property Administration (CNIPA) The First Office Action for Chinese Application 202211386717.5 Jun. 17, 2023 7 Pages (With Translation).

The European Patent Office (EPO) The Extended European Search Report for 23733195.4 Jun. 14, 2024 5 Pages.

MATERIAL MANAGEMENT METHOD AND APPARATUS, COMPUTER DEVICE, AND STORAGE MEDIUM

CROSS-REFERENCE TO RELATED APPLICATIONS

This application is a continuation of International Application PCT/CN2023/081127, filed on Mar. 13, 2023, which claims priority to and benefit of patent application No. 202211386717.5 filed with the China National Intellectual Property Administration on Nov. 7, 2022, which are hereby incorporated by reference in their entirety.

TECHNICAL FIELD

The present application relates to the field of batteries, and specifically relates to a material management method, a material management apparatus, a computer device, and a computer readable storage medium.

BACKGROUND ART

In the battery producing and manufacturing processes, in order to facilitate the traceability of battery-related information in the later stage, it is usually needed to scan codes of batteries on a production line to transfer relevant process information to relevant identifications of the batteries. On the production line, each battery station has a corresponding code scanning device, which can be used to register and report the battery station, and then an upper computer will transmit the process information correspondingly according to registration information. However, physical addresses or network addresses of the code scanning devices may be abnormal due to some reasons, resulting in errors in the reported station registration information, which in turn leads to errors in the transmission of the relevant process information.

SUMMARY

In view of the above problems, the present application provides a material management method, a material management apparatus, a computer device, and a computer readable storage medium.

The present application provides a material management method, applied to a battery production line, wherein the battery production line is provided with a code scanning system, the production line includes a plurality of stations, the code scanning system is configured with a blocking device corresponding to each station and a code scanning device bound to each station, and the method includes:
controlling, after a plurality of battery cells placed on the plurality of stations reach designated code scanning positions, each blocking device to work in a first working state according to a predetermined sequence, thereby blocking identifications of the battery cells on the corresponding stations;
acquiring code scanning results of the code scanning devices corresponding to the blocking devices for the identifications when each blocking device works in the first working state respectively; and
determining, according to the code scanning results, whether a binding relationship between the code scanning devices and the stations is abnormal.

In the present application, before the information transmission of the battery cells, position information of the code scanning devices is pre-detected by using the blocking devices on the production line, the code scanning devices are blocked by the blocking devices, and then according to the code scanning results of the code scanning devices in the blocked state, whether the positions of the code scanning devices are exchanged is judged, so that possible abnormalities are found in time and dealt with in time to ensure that the information transmission of the battery cells is correct.

In some embodiments, the method includes:
controlling, in a case that the plurality of battery cells on the plurality of stations have not reached the designated code scanning positions, all the blocking devices to work in a second working state, wherein, when the blocking devices work in the second working state, the code scanning devices are able to scan the identifications of the battery cells.

In this way, before the battery cells reach the designated code scanning positions, the blocking devices are controlled to work in the second working state, which facilitates operations such as initialization detection of the code scanning devices.

In some embodiments, the controlling, after a plurality of battery cells placed on the plurality of stations reach designated code scanning positions, each blocking device to work in a first working state according to a predetermined sequence, thereby blocking identifications of the battery cells on the corresponding stations, includes:
controlling, according to the predetermined sequence, the blocking devices one by one to switch from the second working state to the first working state; and
controlling other blocking devices other than the blocking devices working in the first working state to maintain the second working state.

In this way, according to the predetermined sequence, the blocking devices are controlled one by one to switch the working state, so that the code scanning results of the blocked code scanning devices and other code scanning devices are different, and then it is confirmed whether the position information of the code scanning devices is abnormal.

In some embodiments, the controlling, after a plurality of battery cells placed on the plurality of stations reach designated code scanning positions, each blocking device to work in a first working state according to a predetermined sequence, thereby blocking identifications of the battery cells on the corresponding stations, includes:
controlling, after the plurality of battery cells placed on the plurality of stations reach the designated code scanning positions, the code scanning devices to perform initial code scanning verification; and
controlling, after passing the initial code scanning verification, each blocking device to work in the first working state according to the predetermined sequence, thereby blocking the identifications of the battery cells on the corresponding stations.

In this way, before detecting the binding relationship between the code scanning devices and the stations, initial code scanning verification is performed on the code scanning devices to confirm whether each code scanning device can scan the identifications normally, thereby eliminating the reason of possible faults of the code scanning devices if the code scanning devices cannot scan the identifications after the blocking devices switch the working state subsequently.

In some embodiments, the determining, according to the code scanning results, whether a binding relationship between the code scanning devices and the stations is abnormal, includes:

confirming, in a case that the code scanning results are a first result, that the binding relationship between the code scanning devices and the stations is abnormal, the first result being a code scanning result that the code scanning devices corresponding to the blocking devices are able to scan codes normally in a case that the blocking devices work in the first working state.

In this way, in a case that the code scanning devices are blocked, but can still return the normal code scanning results, it is confirmed that the binding relationship between the code scanning devices and the stations is abnormal.

In some embodiments, the determining, according to the code scanning results, whether a binding relationship between the code scanning devices and the stations is abnormal, includes:

confirming, in a case that the code scanning results are a second result, that the binding relationship between the code scanning devices and the stations is normal, the second result being a code scanning result that the code scanning devices corresponding to the blocking devices are not able to scan codes normally in a case that the blocking devices work in the first working state.

In this way, in a case that the code scanning devices are blocked, and return abnormal code scanning results, it is confirmed that the binding relationship between the code scanning devices and the stations is normal.

In some embodiments, the method further includes: issuing an alarm prompt in a case that it is determined according to the code scanning results that the binding relationship between the code scanning devices and the stations is abnormal.

In this way, when the binding relationship between the code scanning devices and the stations is abnormal, the alarm prompt can be issued, so that the abnormal situation can be resolved in time to ensure the normal operation of the production line.

The present application provides a material management apparatus, applied to a battery production line, wherein the battery production line is provided with a code scanning system, the production line includes a plurality of stations, the code scanning system is configured with a blocking device corresponding to each station and a code scanning device bound to each station, and the material management apparatus includes:

a controlling module, configured to control, after a plurality of battery cells placed on the plurality of stations reach designated code scanning positions, each blocking device to work in a first working state according to a predetermined sequence, thereby blocking identifications of the battery cells on the corresponding stations;

an acquiring module, configured to acquire code scanning results of the code scanning devices corresponding to the blocking devices for the identifications when each blocking device works in the first working state respectively; and a processing module, configured to determine, according to the code scanning results, whether a binding relationship between the code scanning devices and the stations is abnormal.

The present application further provides a computer device, including a processor and a memory storing a computer program, which, when executed by the processor, implements the above material management method.

The present application further provides a computer readable storage medium storing a computer program, which, when executed by one or more processors, implements the above material management method.

Additional aspects and advantages of the embodiments of the present application will be set forth in the description which follows, and in part will be obvious from the following description, or may be learned by practice of the embodiments of the present application.

DESCRIPTION OF DRAWINGS

Various other advantages and benefits will become apparent to those of ordinary skill in the art upon reading the following detailed description of embodiments. The drawings are for the purpose of illustrating some embodiments only and are not to be considered a limitation to the present application. Also, the same components are denoted by the same reference numerals throughout the drawings. In the accompanying drawings.

the above and/or additional aspects and advantages of the present application will become apparent and understandable from the description of the embodiments in conjunction with the following drawings, wherein.

DETAILED DESCRIPTION

Figure 1:
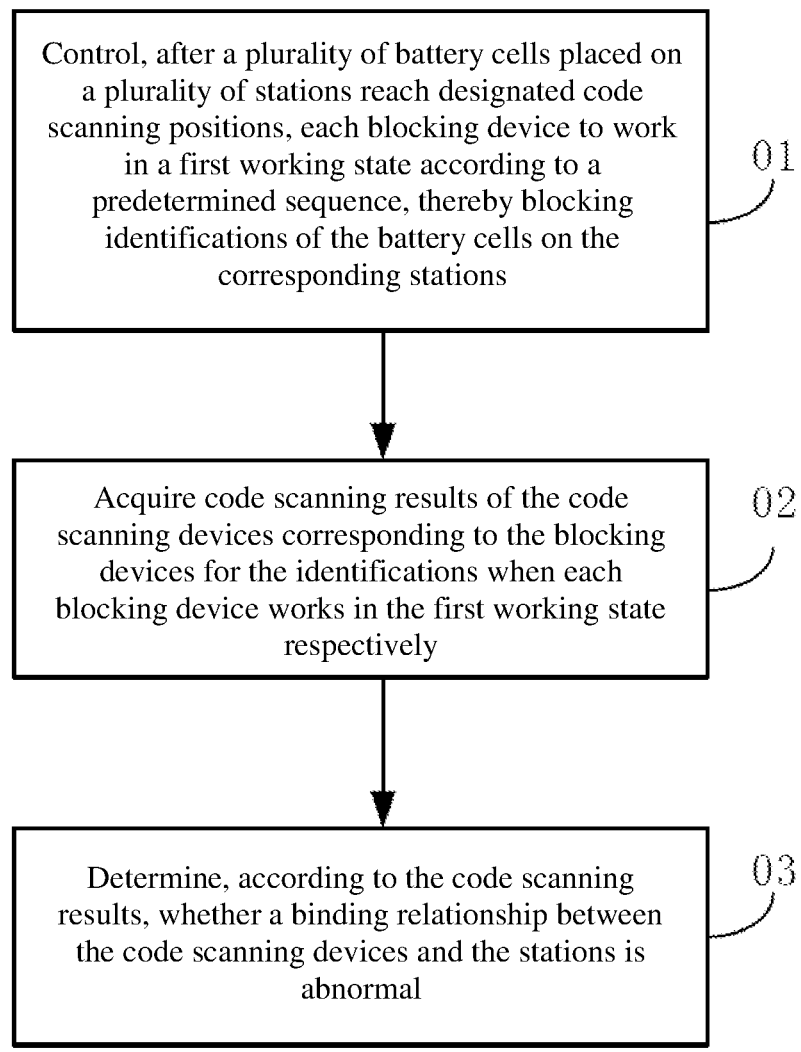
FIG. 1 is a schematic flow diagram of a material management method according to some embodiments of the present application.

Embodiments of the technical solutions of the present application will be described in detail below in conjunction with the drawings. The following embodiments are only used to more clearly illustrate the technical solutions of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The phrase appearing in various positions in the specification does not necessarily refer to the same embodiment, nor is it an independent or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "I" herein generally means that the associated objects before and after it are in an "or" relationship.

In the description of the embodiments of the present application, the term "a plurality of" refers to two or more (including two), and similarly, "a plurality of groups" refers to two or more (including two) groups, and "a plurality of sheets" refers to two or more (including two) sheets.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

Batteries are an indispensable power source in daily life and industrial production, and the demand is very large. Therefore, production efficiency is an important factor affecting the profitability of battery manufacturers. In addition, the reliability of battery structures and performance is also a key factor determining whether a battery manufacturer has sustainable competitiveness and benefits. Therefore, in the battery production process, realizing the automatic processing and production of batteries and eliminating the influence of manual misoperation is an important way to improve the production efficiency and product reliability of batteries.

In order to facilitate the traceability of information in follow-up links of batteries, in the production process of battery cells, outer surfaces of the battery cells are often sprayed with identifications such as barcodes and QR codes, and then an upper computer is used to transmit information such as a corresponding manufacturing process to the identifications. On a production line, each battery station has a corresponding code scanning device, which can be used to register and report the battery station, and then an upper computer will transmit process information correspondingly according to registration information. However, physical addresses or network addresses of the code scanning devices may be abnormal due to some reasons, such as manual replacement, resulting in errors in the reported station registration information of battery cells, which in turn leads to errors in the transmission of the relevant process information.

Based on this, the applicant has designed a material management method for a battery production line after in-depth research. Before assigning information to identifications of battery cells, corresponding relationships between code scanning devices and stations are checked one by one through relevant mechanisms on the production line to ensure that the corresponding relationships between the code scanning devices and the stations are correct, and the station information of the battery cells can be reported accurately, so that it is ensured that an upper computer can transmit relevant process manufacturing information to the corresponding battery cells according to the station information.

The battery cells disclosed in embodiments of the present application can be used in electrical apparatuses using batteries as power sources or in various energy storage systems using batteries as energy storage elements. The electrical apparatuses may be, but are not limited to, a mobile phone, a tablet, a laptop, an electric toy, an electric tool, a battery vehicle, an electric vehicle, a ship, a spacecraft, and so on. The electric toy may include fixed or mobile electric toys, such as game consoles, electric car toys, electric ship toys, and electric airplane toys. The spacecraft may include airplanes, rockets, space shuttles, spaceships, and the like. In the following embodiments, for the convenience of description, the electrical apparatus is a vehicle. The vehicle may be a fuel vehicle, a gas vehicle, or a new energy vehicle, and the new energy vehicle may be an all-electric vehicle, a hybrid vehicle, or an extended-range electric vehicle. The interior of the vehicle is provided with a battery, and the battery may be provided at the bottom or head or tail of the vehicle. The battery may be used to power the vehicle. For example, the battery may be used as an operating power source of the vehicle. The vehicle may further include a controller and a motor. The controller is used to control the battery to power the motor. For example, the controller is used for meeting the operating power demand when the vehicle is starting, navigating and driving. In addition, the battery may also be used as a driving power source of the vehicle to replace or partially replace fuel or natural gas to provide driving power for the vehicle.

Referring to FIG. 1, the present application provides a material management method for a battery production line, including the following steps:

01: controlling, after a plurality of battery cells placed on a plurality of stations reach designated code scanning positions, each blocking device to work in a first working state according to a predetermined sequence, thereby blocking identifications of the battery cells on the corresponding stations;

02: acquiring code scanning results of the code scanning devices corresponding to the blocking devices for the identifications when each blocking device works in the first working state respectively; and 03: determining, according to the code scanning results, whether a binding relationship between the code scanning devices and the stations is abnormal.

Figure 2:
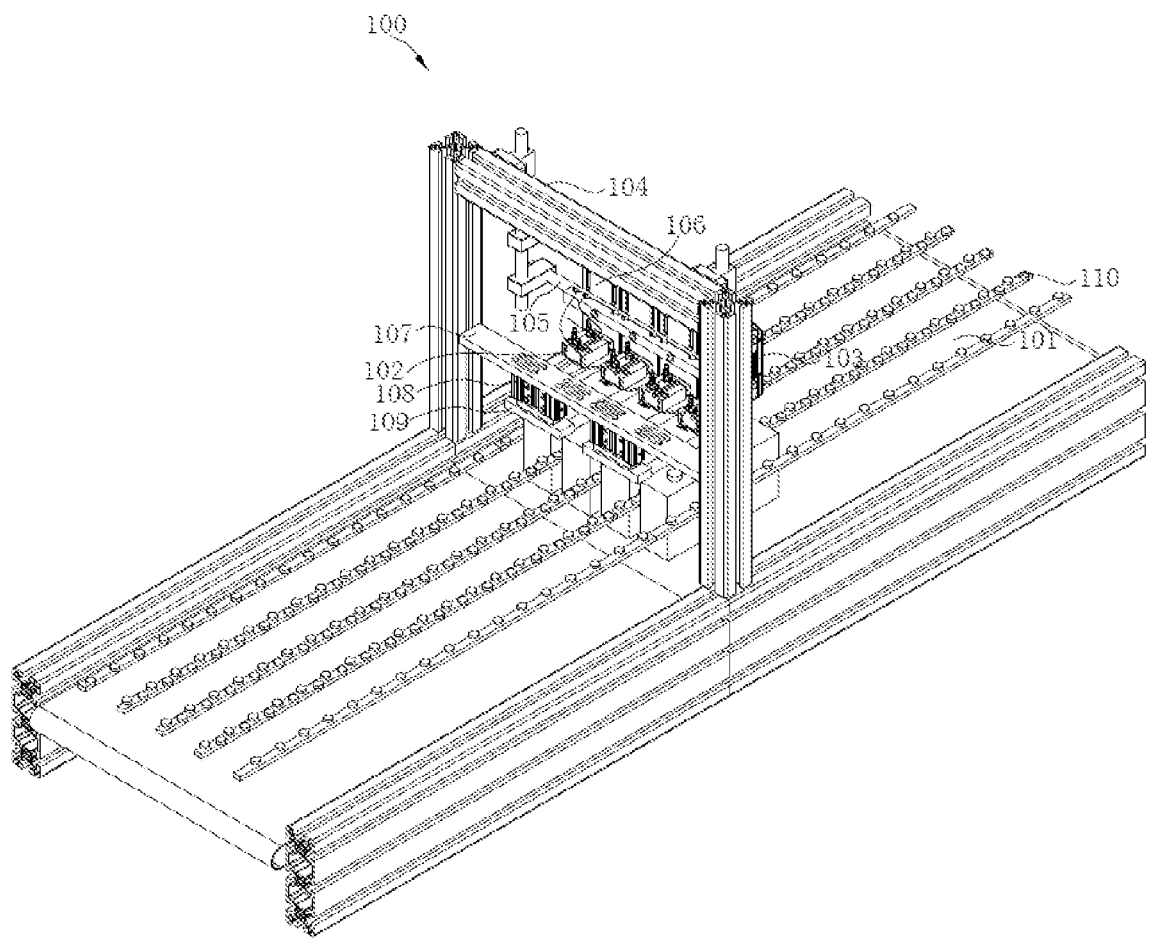
FIG. 2 is a schematic structural diagram of a code scanning system according to some embodiments of the present application.
Figure 3:
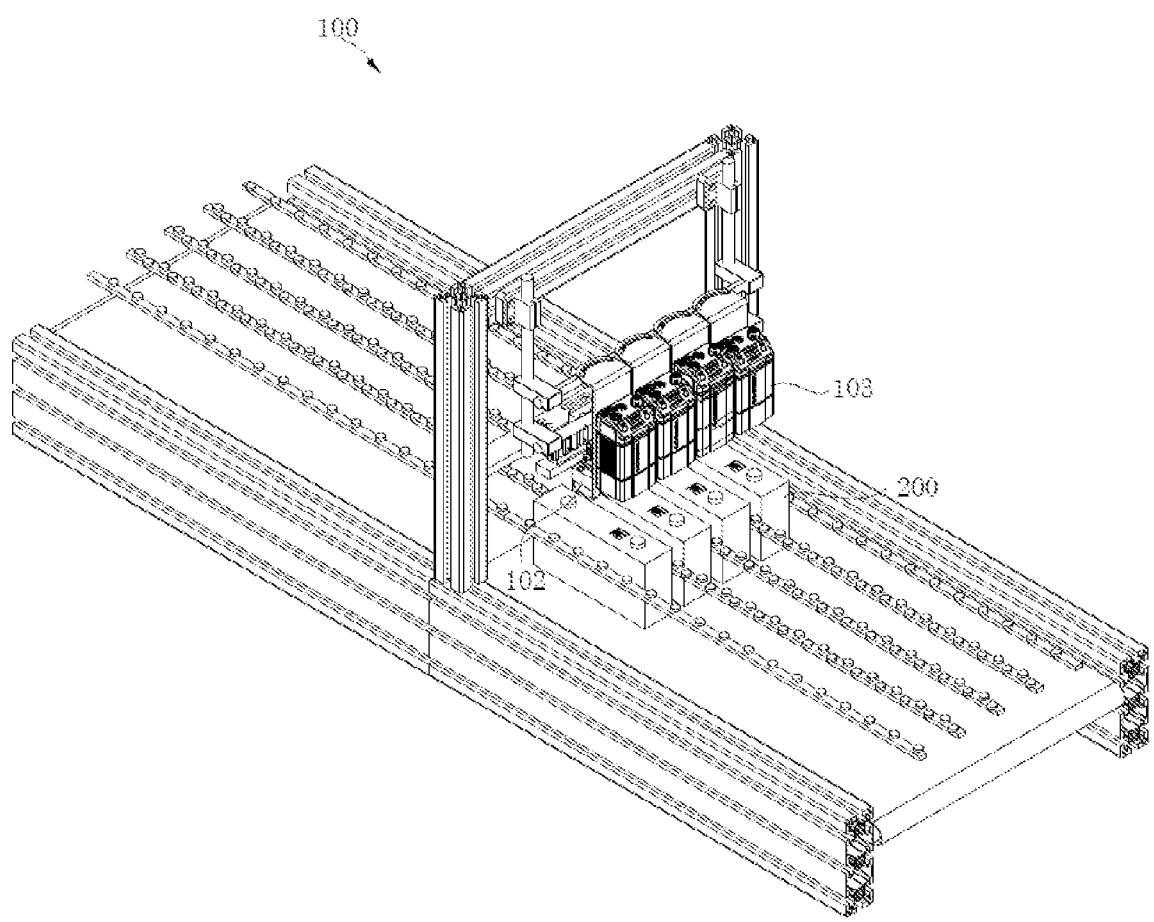
FIG. 3 is a schematic structural diagram of a code scanning system according to some embodiments of the present application.
Figure 4:
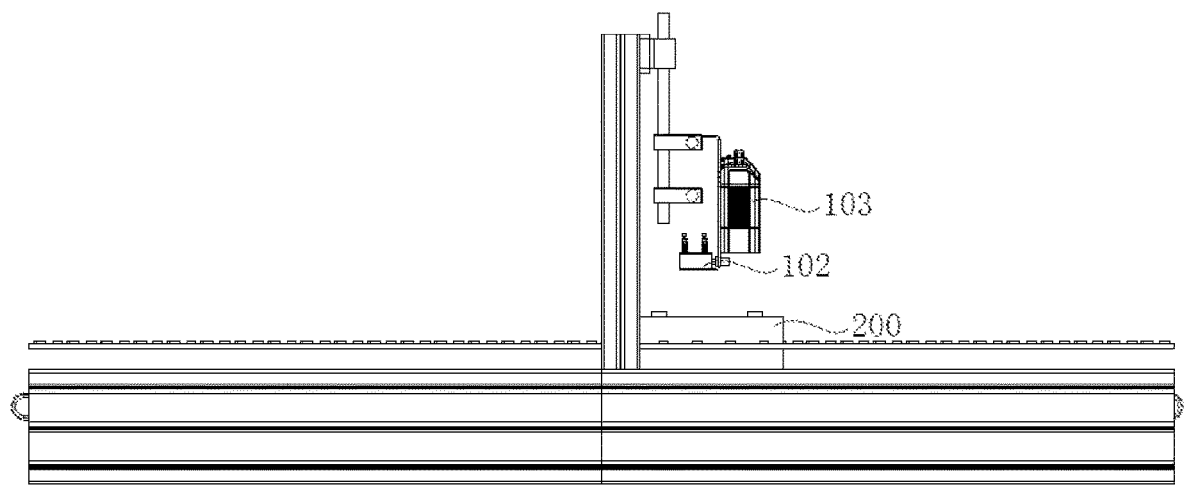
FIG. 4 is a schematic structural diagram of a code scanning system according to some embodiments of the present application.

Specifically, referring to FIGS. 2-4, the method of the present application is used for the battery production line, and a code scanning system 100 is disposed on the battery production line. The production line includes the plurality of stations 101, and the code scanning system is configured with the blocking device 102 corresponding to each station 101 and the code scanning device 103 bound to each station.

The code scanning system is tooling installed on the battery production line. The code scanning system includes a gantry frame 104, a fixed bracket 105 is installed on the gantry frame 104, the fixed bracket includes a plurality of fixed connecting rods, one of the fixed connecting rods is equipped with a mounting sheet metal 106, and the mounting sheet metal 106 is used to install the code scanning devices 103, wherein the number of the code scanning devices 103 corresponds to the number of the stations 101, and in one example, each station 101 corresponds to one code scanning device 103.

The code scanning devices 103 are disposed towards the top walls of the battery cells 200, and the top walls of the battery cells 200 are attached with the identifications, which may be a QR code, a barcode, or the like. When the battery cells 200 move following the production line to the designated code scanning positions, the identifications should be within the field of view of the code scanning devices 103. The designated code scanning positions are the positions where the identifications can be recognized by the code scanning devices 103. The gantry frame 104 in the present application is also equipped with a mounting plate 107, the mounting plate 107 is used to install battery blocking cylinders 108 and blocking strips 109, and the battery blocking cylinders 108 drive the blocking strips 109 up and down under the drive of corresponding air sources, thereby blocking or releasing the battery cells 200 on the stations 101. In actual operations, the battery blocking cylinders 108 are usually in an extended state, and are blocked when the battery cells 200 move to the positions of the blocking strips 109 along the assembly line. The code scanning system 100 may also be equipped with sensors, such as a photoelectric sensor. According to detection signals of the sensors, it can be known that the battery cells 200 are in place, and the code scanning devices 103 can perform a code scanning operation.

In the present application, the blocking device 102 is further configured on the side of each code scanning device 103 close to the battery cell 200, and the blocking device 102 may also be fixedly installed on the mounting sheet metal. Each blocking device 102 may include a cylinder and a blocking element. The blocking devices 102 are communicated with the corresponding air sources, and the air sources drive the cylinders to drive the blocking elements to switch between the first working state and a second working state. When the blocking elements or the blocking devices 102 are in the first working state, the blocking elements extend out to block the code scanning devices 103, and the code scanning devices 103 cannot normally scan the identifications of the battery cells 200 on the stations 101. When the blocking elements or the blocking devices 102 are in the second working state, the blocking elements retract and do not block the code scanning devices 103, and the code scanning devices 103 can normally scan the identifications of the battery cells 200 on the stations 101.

It can be understood that the blocking elements are driven by the cylinders, and in order to ensure that the blocking devices 102 on each station 101 can work according to the predetermined sequence, it is needed to correctly connect the air sources and the cylinders through air pipes. In order to prevent possible replacement of the air pipes, the foolproofing of the air pipes can be realized through the fixed connecting rods. Specifically, arc via holes corresponding to the blocking devices 102 may be formed in the fixed connecting rods. Each cylinder corresponds to two air pipes, and the two air pipes are connected to an air inlet port and an air outlet port of the cylinder respectively. Each air pipe penetrates through the corresponding arc via hole, one end is connected to the air source, and the other end is connected to the corresponding port on the cylinder. In some embodiments, the fixed connecting rods may also be sleeved with foolproofing rods, the foolproofing rods are also provided with arc via holes, and the radius of the arc via holes may be slightly smaller than the diameter of the air pipes, so that the air pipes may be clamped through the arc via holes. After the connection of the air pipes is completed, the foolproofing rods and the fixed connecting rods may be locked with screws, and the locking screws may be further sealed as required to prevent the air pipes from being replaced.

In addition, the production line further includes a plurality of guide strips 110, and the guide strips 110 are disposed between the battery cells 200 of the adjacent stations 101 and used to limit the movement of the battery cells 200 on the production line.

In the present application, based on the configuration of the tooling of the production line described above, detection is performed before code scanning of the battery cells 200 to ensure that the reported information of the stations 101 of the battery cells 200 is correct. In order to improve work efficiency, the production line may divide the plurality of stations 101 through the guide strips 110, and may transport the plurality of battery cells 200 at the same time, and scan codes for the plurality of battery cells 200 at one time.

The predetermined sequence is the sequence in which the code scanning devices 103 are detected, for example, the detection sequence of the code scanning devices 103 may be determined according to the sequence of the stations 101, of course, may also be determined according to the actual production conditions on the stations 101, for example, the battery cells 200 are placed on a part of the plurality of stations 101.

As described above, the first working state refers to that the blocking elements extend out to block the code scanning devices 103, and when the blocking devices 102 work in the first working state, the code scanning devices 103 cannot normally scan the identifications of the battery cells 200 on the stations 101.

In the conventional state, the blocking elements of all the blocking devices 102 are in the second working state, namely retraction, the working state of the blocking devices 102 corresponding to the code scanning devices 103 currently in the detection state is controlled to switch according to the detection requirements, and the blocking devices are switched from the second working state to the first working state in which the blocking elements extend out. According to the code scanning results of the code scanning devices 103 when the blocking devices 102 work in the first working state, whether a binding relationship between the code scanning devices 103 and the stations 101 is abnormal is confirmed. Subsequent operations may be performed after the code scanning devices 103 of all the stations 101 have been detected, namely the detection process is ended.

It is understandable that the possible reasons for errors in reported information of the stations 101 include the following situations:

I. The mechanical positions or real physical addresses of the code scanning devices 103 bound to the stations 101 are exchanged. For example, if the code scanning device 103 originally corresponding to the station 1 is exchanged to the station 2, then what the code scanning device 103 scans will be the identification of the battery cell 200 located at the station 2, and after the station information is reported to the upper computer, the upper computer still thinks that the information comes from the station 1 according to the IP address of the station information, so it transmits the process manufacturing information corresponding to the station 1 to the battery cell 200 at the station 2, resulting in information transmission errors of the battery cell 200. However, if the code scanning devices 103 on the production line are exchanged irregularly on a large scale, it will result in information abnormalities of the battery cells 200 in batches.

II. The IP addresses of the code scanning devices 103 bound to the stations 101 are exchanged. For example, if the IP address of the code scanning device 103 corresponding to the station 1 is exchanged to the code scanning device 103 at the station 2, then although what the code scanning device 103 scans is still the identification of the battery cell 200 located at the station 1, after the station information is reported to the upper computer, the upper computer will think that the information comes from the station 2 according to the IP address of the station information, so it transmits the process manufacturing information corresponding to the station 2 to the battery cell 200 at the station 1, resulting in information transmission errors of the battery cell 200. However, if the IP addresses of the code scanning devices 103 on the production line are exchanged irregularly on a large scale, it will result in information abnormalities of the battery cells 200 in batches.

In the present application, the code scanning devices 103 are blocked by the blocking devices 102, and then according to the code scanning results of the code scanning devices 103 in the blocked state, whether the mechanical positions or IP addresses of the code scanning devices 103 are exchanged is judged. Possible abnormalities can be detected early and processed in time to ensure normal production.

To sum up, in the present application, before the information transmission of the battery cells 200, the position information of the code scanning devices 103 is pre-detected by using the blocking devices 102 on the production line, the code scanning devices 103 are blocked by the blocking devices 102, and then according to the code scanning results of the code scanning devices 103 in the blocked state, whether the positions of the code scanning devices 103 are exchanged is judged, so that possible abnormalities are found in time and dealt with in time to ensure that the information transmission of the battery cells 200 is correct.

Figure 5:
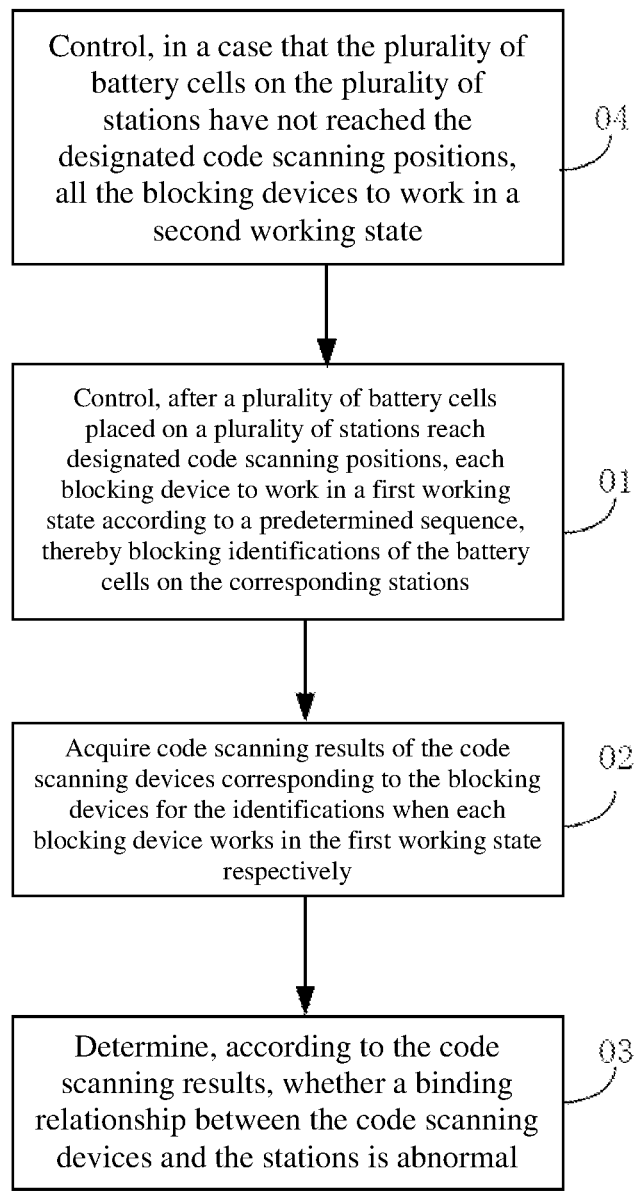
FIG. 5 is a schematic flow diagram of a material management method according to some embodiments of the present application.

Referring to FIG. 5, in some embodiments, the method further includes the following steps:

04: controlling, in a case that the plurality of battery cells 200 on the plurality of stations 101 have not reached the designated code scanning positions, all the blocking devices 102 to work in the second working state.

Specifically, when the battery cells 200 have not reached the designated code scanning positions, all the blocking devices 102 are controlled to work in the second working state, and when the blocking devices 102 work in the second working state, the code scanning devices 103 are able to scan the identifications of the battery cells 200. By controlling the intake and outlet states of the corresponding cylinders, the blocking elements of the blocking devices 102 are in a retracted state, so that when the battery cells 200 reach the designated positions, the code scanning devices 103 can normally scan the two-dimensional identifications on the battery cells 200, which facilitates initialization verification and other operations before detection.

In this way, before the battery cells 200 reach the designated code scanning positions, the blocking devices 102 are controlled to work in the second working state, which facilitates operations such as initialization detection of the code scanning devices 103.

Figure 6:
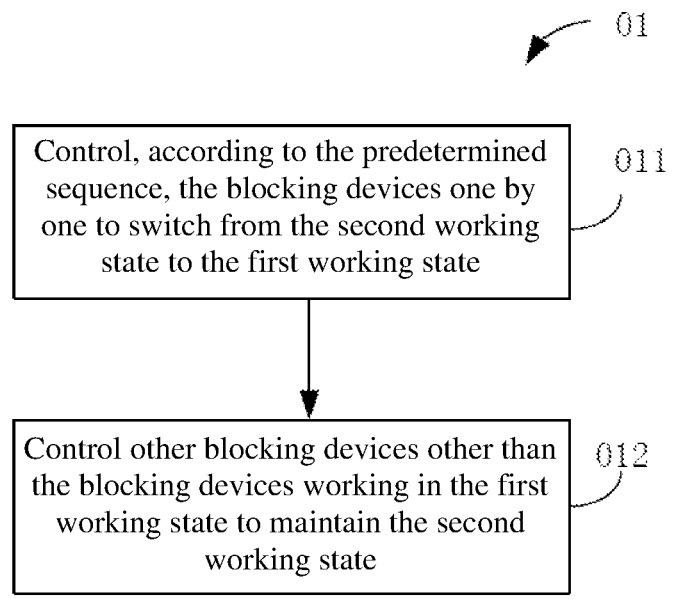
FIG. 6 is a schematic flow diagram of a material management method according to some embodiments of the present application.

Referring to FIG. 6, in some embodiments, step 01 includes:

011: controlling, according to the predetermined sequence, the blocking devices 102 one by one to switch from the second working state to the first working state; and 012: controlling other blocking devices 102 other than the blocking device 102 working in the first working state to maintain the second working state.

Specifically, taking a control strategy of one blocking device 102 as an example, when the plurality of battery cells 200 reach the designated code scanning positions, the blocking elements of the blocking devices 102 are driven by the cylinders to extend out to block the corresponding code scanning devices 103. At the same time, the other blocking devices 102 are controlled to maintain the second working state, so that the code scanning results of the blocked code scanning device 103 and other code scanning devices 103 are different. After the code scanning results are reported, the next blocking device 102 is controlled to switch its working state to the first working state, and at the same time, the current blocking device 102 is controlled to switch from the first working state to the second working state. Further, according to the predetermined sequence, such as the sequence of the stations 101, the blocking devices 102 are controlled one by one to switch the working states, and the blocking elements are driven by the cylinders to extend out to block the corresponding code scanning devices 103.

In this way, according to the predetermined sequence, the blocking devices 102 are controlled one by one to switch the working state, so that the code scanning results of the blocked code scanning device 103 and other code scanning devices 103 are different, and then it is confirmed whether the position information of the code scanning devices 103 is abnormal.

Figure 7:
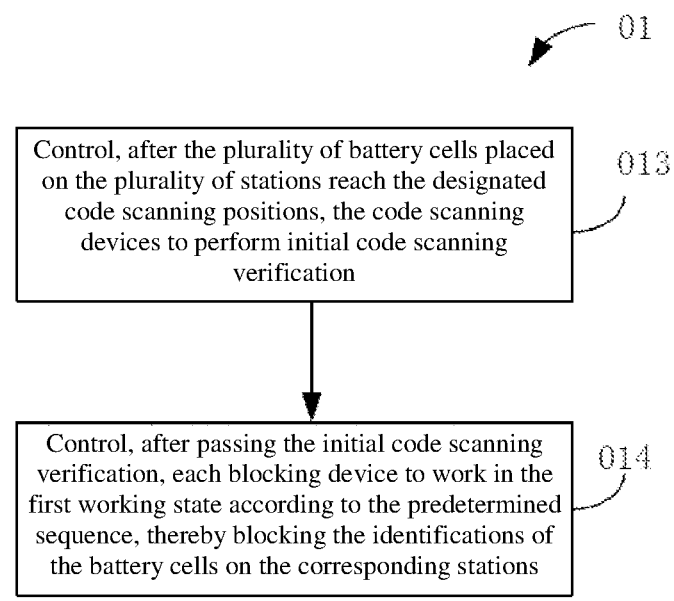
FIG. 7 is a schematic flow diagram of a material management method according to some embodiments of the present application.

Referring to FIG. 7, in some embodiments, step 01 includes:

013: controlling, after the plurality of battery cells 200 placed on the plurality of stations 101 reach the designated code scanning positions, the code scanning devices 103 to perform initial code scanning verification; and 014: controlling, after passing the initial code scanning verification, each blocking device 102 to work in the first working state according to the predetermined sequence, thereby blocking the identifications of the battery cells 200 on the corresponding stations 101.

Specifically, after the battery cells 200 reach the designated code scanning positions, and before detection, initial code scanning verification is performed first. The purpose of the initial code scanning verification is to confirm whether each code scanning device 103 can work normally. As mentioned above, when the battery cells 200 have not reached the designated code scanning positions, the blocking devices 102 are in the second working state, that is, the blocking elements are in the retracted state. Before the battery cells 200 reach the designated code scanning positions, and the blocking devices 102 are controlled to switch the working state in sequence, depending on the blocking devices 102 being in the second working state, the identification of each battery cell 200 is in the field of view of the corresponding code scanning device 103. In this case, the code scanning devices 103 are controlled to scan the identifications, in the process of initial code scanning verification, the binding relationship of code scanning is not considered, and attention is paid to whether each code scanning device 103 can scan the identifications normally, thereby eliminating the reason of possible faults of the code scanning devices 103 if the code scanning devices 103 cannot scan the identifications after the blocking devices 102 switch the working state subsequently. After passing the initial code scanning verification and confirming that the code scanning devices 103 can work normally, each blocking device 102 will be controlled one by one to switch the working state according to the predetermined sequence to detect the positions of the code scanning devices 103.

In this way, before detecting the binding relationship between the code scanning devices 103 and the stations 101, initial code scanning verification is performed on the code scanning devices 103 to confirm whether each code scanning device 103 can scan the identifications normally, thereby eliminating the reason of possible faults of the code scanning devices 103 if the code scanning devices 103 cannot scan the identifications after the blocking devices 102 switch the working state subsequently.

Figure 8:
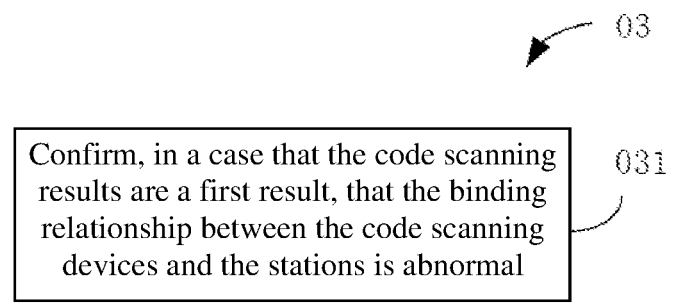
FIG. 8 is a schematic flow diagram of a material management method according to some embodiments of the present application.

Referring to FIG. 8, in some embodiments, step 03 includes:

031: confirming, in a case that the code scanning results are a first result, that the binding relationship between the code scanning devices 103 and the stations 101 is abnormal.

Specifically, the first result is a code scanning result that the code scanning devices 103 corresponding to the blocking devices 102 can scan codes normally in a case that the blocking devices 102 work in the first working state, that is, the blocking elements extend out to block the code scanning devices 103. It is understandable that, in a normal state, if the code scanning devices 103 are blocked by the corresponding blocking devices 102, the code scanning devices cannot scan the identifications on the corresponding battery cells 200. In one example, when codes can be scanned normally, a code scanning result OK may be returned, and when code scanning is abnormal, a code scanning result NG is returned. That is to say, in the normal state, if the code scanning devices 103 are blocked by the corresponding blocking devices 102, the code scanning result returned by the code scanning devices 103 should be NG. If the result returned at this time is OK, then there may be a situation where the code scanning devices 103 are exchanged as described above, that is, the binding relationship between the code scanning devices 103 and the stations 101 is abnormal.

In this way, in a case that the code scanning devices 103 are blocked, but can still return the normal code scanning results, it is confirmed that the binding relationship between the code scanning devices 103 and the stations 101 is abnormal.

Figure 9:
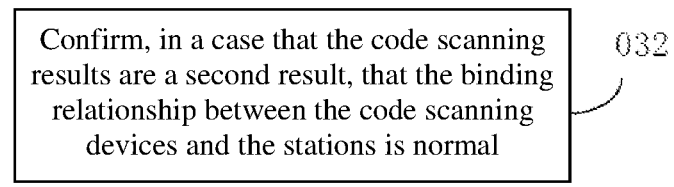
FIG. 9 is a schematic flow diagram of a material management method according to some embodiments of the present application.

Referring to FIG. 9, in some embodiments, step 03 includes:

032: confirming, in a case that the code scanning results are a second result, that the binding relationship between the code scanning devices 103 and the stations 101 is normal.

Specifically, the second result is a code scanning result that the code scanning devices 103 corresponding to the blocking devices 102 cannot scan codes normally in a case that the blocking devices 102 work in the first working state. It is understandable that, in a normal state, if the code scanning devices 103 are blocked by the corresponding blocking devices 102, the code scanning devices cannot scan the identifications on the corresponding battery cells 200. In one example, when codes can be scanned normally, a code scanning result OK may be returned, and when code scanning is abnormal, a code scanning result NG is returned. That is to say, in the normal state, if the code scanning devices 103 are blocked by the corresponding blocking devices 102, the code scanning result returned by the code scanning devices 103 should be NG. If the result returned at this time is NG, it can be considered that the binding relationship between the code scanning devices 103 and the stations 101 is normal.

In this way, in a case that the code scanning devices 103 are blocked, and return abnormal code scanning results, it is confirmed that the binding relationship between the code scanning devices 103 and the stations 101 is normal.

Figure 10:
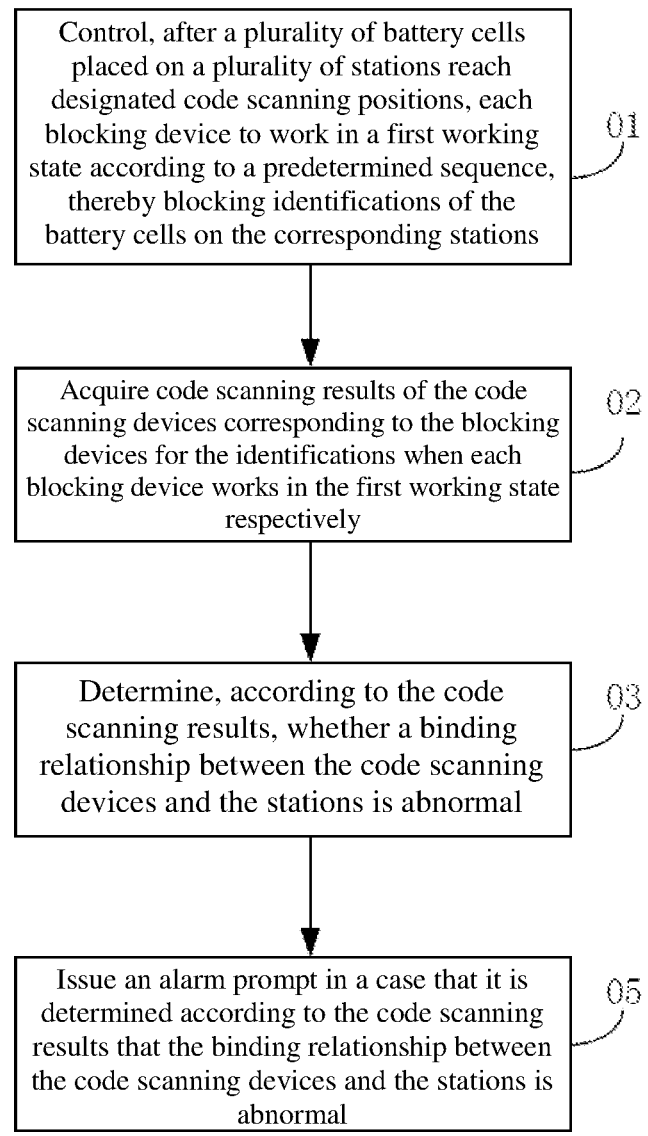
FIG. 10 is a schematic flow diagram of a material management method according to some embodiments of the present application.

Referring to FIG. 10, in some embodiments, the method further includes the following steps:

05: issuing an alarm prompt in a case that it is determined according to the code scanning results that the binding relationship between the code scanning devices 103 and the stations 101 is abnormal.

Specifically, if it is confirmed that there is an abnormality according to the code scanning results, the alarm prompt can be issued and the production line will be suspended. According to the alarm prompt, relevant staff learn that there is an abnormality in the binding relationship between the code scanning devices 103 and the stations 101, and can conduct related abnormality investigations to solve the abnormal situation in time. After inspection, detection is performed again, and production can resume after normality is confirmed.

In this way, when the binding relationship between the code scanning devices 103 and the stations 101 is abnormal, the alarm prompt can be issued, so that the abnormal situation can be resolved in time to ensure the normal operation of the production line.

In the following, a 4-station 101 production line is taken as an example to illustrate the material management method of the present application:

after battery cells 200 on four stations 101 reach designated code scanning positions, initial code scanning verification is performed first, and after passing the initial code scanning verification, binding relationships between code scanning devices 103 and the stations 101 are detected one by one. First, a blocking device 102 of the station 1 is controlled to block the battery cell 200 at the station 1, blocking devices 102 of other stations 101 remain in a retracted state, and the code scanning device 103 of each station performs a code scanning operation and reports a code scanning operation result. Whether there is an abnormality is judged according to the code scanning result. Under normal circumstances, the code scanning result of the code scanning device 103 at the station 1 is NG, and the code scanning results of other code scanning devices 103 are OK. If not, the binding relationships between the code scanning devices 103 and the stations 101 are abnormal, an alarm prompt is issued and relevant staff perform maintenance.

Similarly, after the code scanning device 103 of the station 1 is detected, a blocking device 102 of the station 2 is controlled to block the battery cell 200 at the station 2, devices of other stations 101 remain in the retracted state, and the code scanning device 103 of each station performs a code scanning operation and reports a code scanning operation result. Whether there is an abnormality is judged according to the code scanning result. Under normal circumstances, the code scanning result of the code scanning device 103 at the station 2 is NG, and the code scanning results of other code scanning devices 103 are OK.

After the code scanning device 103 of the station 2 is detected, a blocking device 102 of the station 3 is controlled to block the battery cell 200 at the station 3, devices of other stations remain in the retracted state, and the code scanning device 103 of each station 101 performs a code scanning operation and reports a code scanning operation result. Whether there is an abnormality is judged according to the code scanning result. Under normal circumstances, the code scanning result of the code scanning device 103 at the station 3 is NG, and the code scanning results of other code scanning devices 103 are OK.

After the code scanning device 103 of the station 3 is detected, a blocking device 102 of the station 4 is controlled to block the battery cell 200 at the station 4, devices of other stations remain in the retracted state, and the code scanning device 103 of each station 101 performs a code scanning operation and reports a code scanning operation result. Whether there is an abnormality is judged according to the code scanning result. Under normal circumstances, the code scanning result of the code scanning device 103 at the station 4 is NG, and the code scanning results of other code scanning devices 103 are OK.

So far, the detection of all the code scanning devices 103 is completed.

Figure 11:
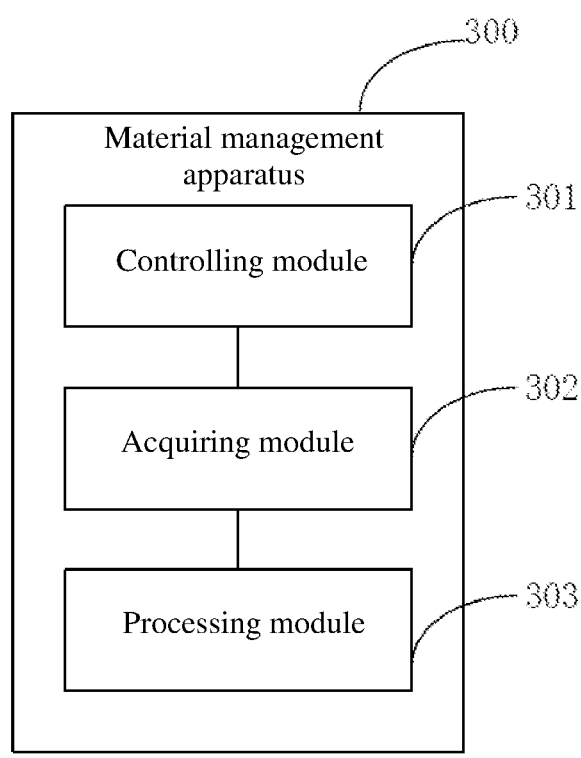
FIG. 11 is a schematic diagram of modules of a material management apparatus according to some embodiments of the present application.

Referring to FIG. 11, the present application further provides a material management apparatus 300, including: a controlling module 301, an acquiring module 302 and a processing module 303. The material management apparatus 300 is used for a battery production line. For relevant settings of the battery production line, please refer to the explanation above, which will not be repeated here.

The controlling module 301 is configured to control, after a plurality of battery cells placed on a plurality of stations reach designated code scanning positions, each blocking device to work in a first working state according to a predetermined sequence, thereby blocking identifications of the battery cells on the corresponding stations.

The acquiring module 302 is configured to acquire code scanning results of the code scanning devices corresponding to the blocking devices for the identifications when each blocking device works in the first working state respectively.

The processing module 303 is configured to determine, according to the code scanning results, whether a binding relationship between the code scanning devices and the stations is abnormal.

In this way, in the present application, before the information transmission of the battery cells, position information of the code scanning devices is pre-detected by using the blocking devices on the production line, the code scanning devices are blocked by the blocking devices, and then according to the code scanning results of the code scanning devices in the blocked state, whether the positions of the code scanning devices are exchanged is judged, so that possible abnormalities are found in time and dealt with in time to ensure that the information transmission of the battery cells is correct.

In some embodiments, the controlling module 301 is further configured to:
control, in a case that the plurality of battery cells on the plurality of stations have not reached the designated code scanning positions, all the blocking devices to work in a second working state, wherein, when the blocking devices work in the second working state, the code scanning devices are able to scan the identifications of the battery cells.

In this way, before the battery cells reach the designated code scanning positions, the blocking devices are controlled to work in the second working state, which facilitates operations such as initialization detection of the code scanning devices.

In some embodiments, the controlling module 301 is configured to:
control, according to the predetermined sequence, the blocking devices one by one to switch from the second working state to the first working state; and
control other blocking devices other than the blocking devices working in the first working state to maintain the second working state.

In this way, according to the predetermined sequence, the blocking devices are controlled one by one to switch the working state, so that the code scanning results of the blocked code scanning devices and other code scanning devices are different, and then it is confirmed whether the position information of the code scanning devices is abnormal.

In some embodiments, the controlling module 301 is configured to:
control, after the plurality of battery cells placed on the plurality of stations reach the designated code scanning positions, the code scanning devices to perform initial code scanning verification; and
control, after passing the initial code scanning verification, each blocking device to work in the first working state according to the predetermined sequence, thereby blocking the identifications of the battery cells on the corresponding stations.

In this way, before detecting the binding relationship between the code scanning devices and the stations, initial code scanning verification is performed on the code scanning devices to confirm whether each code scanning device can scan the identifications normally, thereby eliminating the reason of possible faults of the code scanning devices if the code scanning devices cannot scan the identifications after the blocking devices switch the working state subsequently.

In some embodiments, the processing module 303 is configured to:

confirm, in a case that the code scanning results are a first result, that the binding relationship between the code scanning devices and the stations is abnormal, the first result being a code scanning result that the code scanning devices corresponding to the blocking devices are able to scan codes normally in a case that the blocking devices work in the first working state.

In this way, in a case that the code scanning devices are blocked, but can still return the normal code scanning results, it is confirmed that the binding relationship between the code scanning devices and the stations is abnormal.

In some embodiments, the processing module 303 is configured to:

confirm, in a case that the code scanning results are a second result, that the binding relationship between the code scanning devices and the stations is normal, the second result being a code scanning result that the code scanning devices corresponding to the blocking devices are not able to scan codes normally in a case that the blocking devices work in the first working state.

In this way, in a case that the code scanning devices are blocked, and return abnormal code scanning results, it is confirmed that the binding relationship between the code scanning devices and the stations is normal.

In some embodiments, the apparatus 300 further includes an alarm module, which is configured to:

issue an alarm prompt in a case that it is determined according to the code scanning results that the binding relationship between the code scanning devices and the stations is abnormal.

In this way, when the binding relationship between the code scanning devices and the stations is abnormal, the alarm prompt can be issued, so that the abnormal situation can be resolved in time to ensure the normal operation of the production line.

Each module in the above material management apparatus 300 may be implemented entirely or partially through software, hardware, or a combination thereof. The modules above may be embedded into or independent of a processor in a computer device in a hardware form, or may be stored in a memory in the computer device in a software form, to facilitate calling of the processor to execute operations corresponding to the modules above.

The present application further provides a computer device, including a memory and a processor. A computer program is stored in the memory, and the processor implements the material management method provided by any embodiment above when executing the computer program.

The implementation principle and technical effect of the computer device provided in the foregoing embodiment are similar to those of the foregoing method embodiment, and will not be repeated here.

Figure 12:
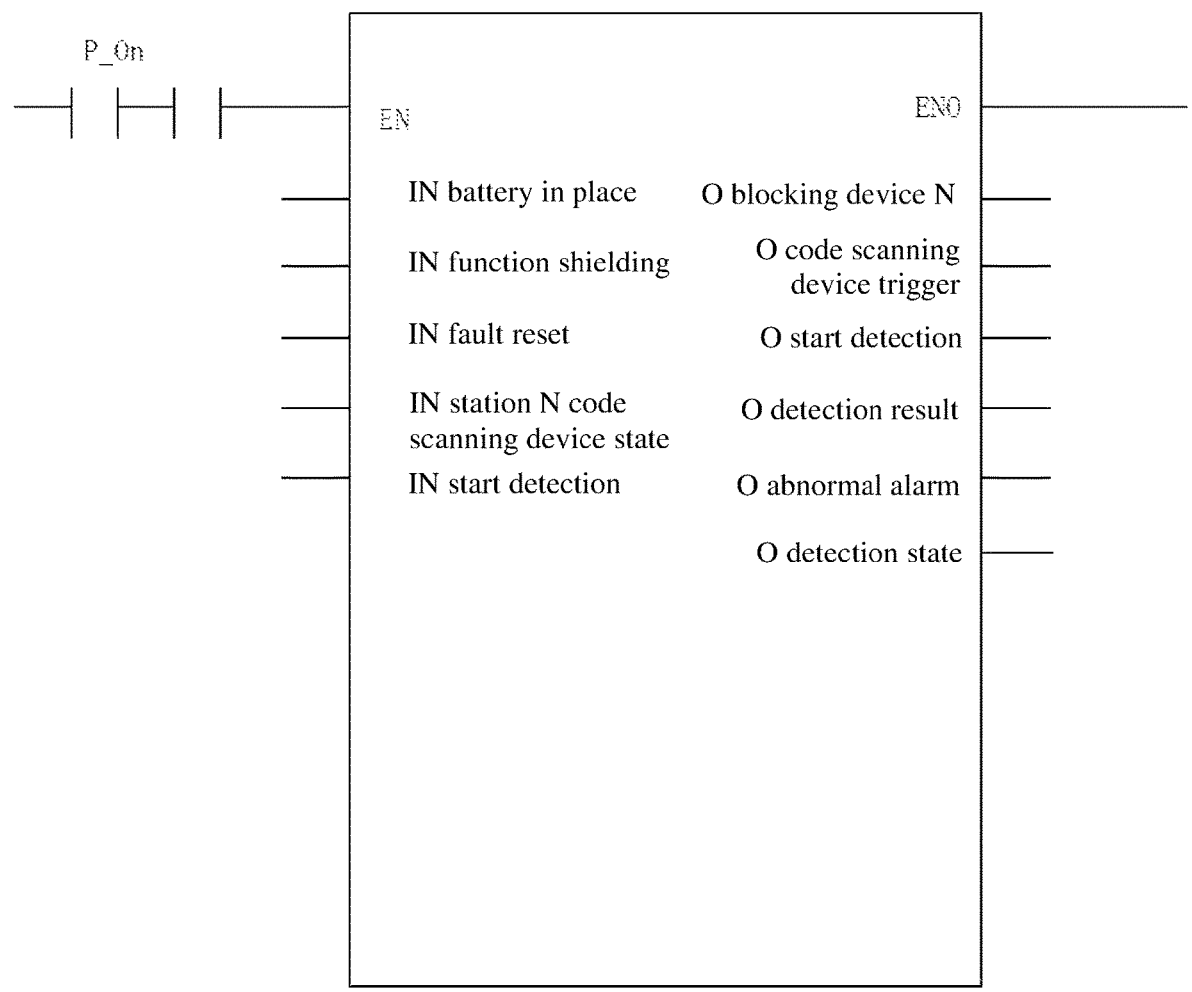
FIG. 12 is a schematic diagram of a program implementation according to some embodiments of the present application.

As shown in FIG. 12, the computer device may be a programmable logic controller, and the above-mentioned material management method may be designed as an implementation form of a functional module, wherein input parameters may include: an enable signal EN, a battery cell in-place signal, a function shielding signal, a fault reset signal, a state signal of a code scanning device at each station, a start detection signal, etc. Output parameters may include: a state of each blocking device, a detection trigger of each code scanning device, a detection state, a detection result, and an abnormality alarm.

Figure 13:
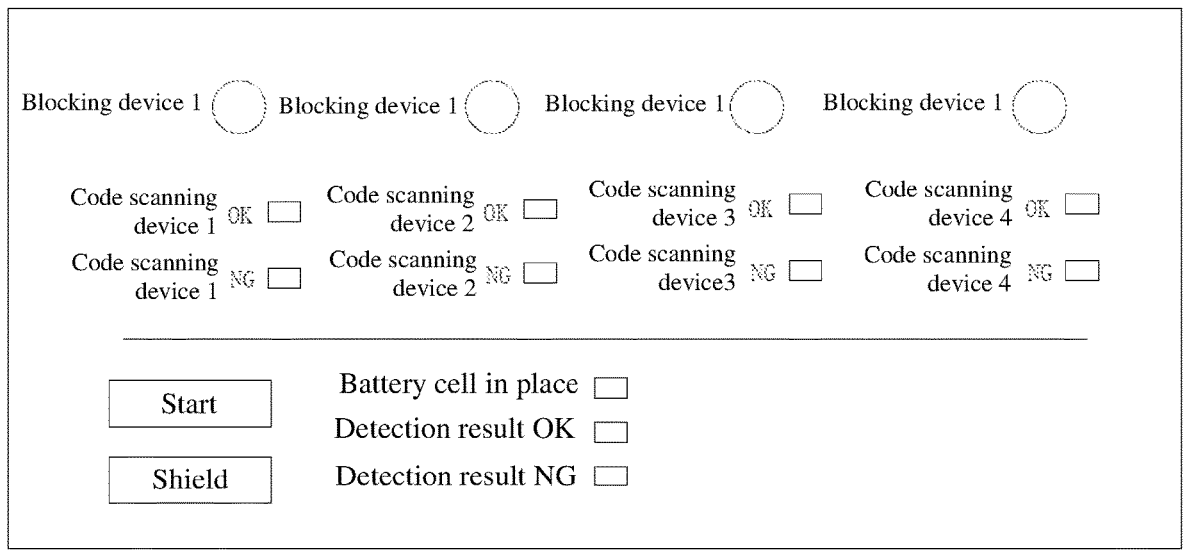
FIG. 13 is a schematic diagram of a visual interface according to some embodiments of the present application.

In addition, a visual design for controlling a detection flow may also be performed, as shown in FIG. 13. A visual interface includes information such as a state of the blocking device of each station, a code scanning result of the code scanning devices, detection start, function shielding, battery cell in-place information, and a detection result, so that relevant staff can conveniently learn the detection process and the state information according to the information in the visual interface.

Figure 14:
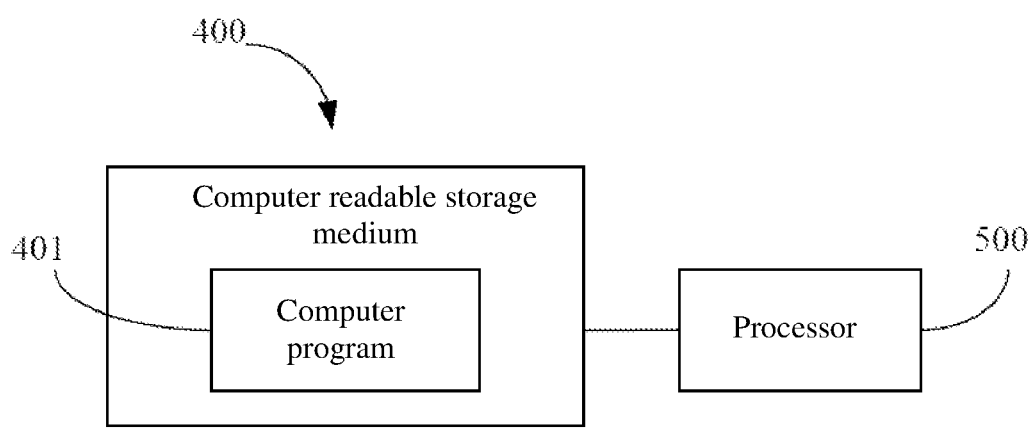
FIG. 14 is a schematic diagram of a connection state of a computer readable storage medium and a processor according to some embodiments of the present application.

Referring to FIG. 14, the present application further provides a computer readable storage medium 400 containing a computer program 401. When executed by one or more processors 500, the computer program 401 causes the one or more processors 500 to execute the material management method in any one of the above-mentioned embodiments.

The implementation principles and technical effects of the provided computer readable storage medium are similar to those of the above-mentioned method embodiment, and will not be repeated here.

Those of ordinary skill in the art can understand that all or part of the process in the method of the above embodiments can be implemented by instructing the relevant hardware through a computer program. The computer program can be stored in a non-volatile computer-readable storage medium. When the computer program is executed, the processes of the embodiments of the above methods may be included. Any reference to a memory, a database or other media used in the various embodiments provided in the present application may include at least one of a non-volatile memory and a volatile memory. The non-volatile memory may include a read-only memory (ROM), magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, or the like. The volatile memory may include a random access memory (RAM), an external cache memory, or the like. As an explanation rather than limitation, the RAM may take various forms, such as a static random access memory (SRAM) or a dynamic random access memory (DRAM). The processor involved in the various embodiments provided in the present application may be a general-purpose processor, a central processing unit, a graphics processor, a digital signal processor, a programmable logic device, a data processing logic devices based on quantum computing, and the like, but is not limited thereto.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A material management method carried out by a material management apparatus, applied to a battery production line, wherein the battery production line is provided with a code scanning system and comprises a plurality of stations, and the code scanning system is configured with a plurality of blocking devices each corresponding to one station and a plurality of code scanning devices each bound to one station, the method comprising:

controlling, after a plurality of battery cells placed on the plurality of stations reach designated code scanning positions, the blocking devices to work in a first working state according to a predetermined sequence, thereby blocking identifications of the battery cells on the corresponding stations;

acquiring code scanning results of the code scanning devices corresponding to the blocking devices for the identifications, respectively, when the blocking devices work in the first working state; and determining, according to the code scanning results, whether a binding relationship between the code scanning devices and the stations is abnormal.

2. The method according to claim 1, comprising:

controlling, in a case that the plurality of battery cells on the plurality of stations have not reached the designated code scanning positions, all the blocking devices to work in a second working state, wherein, when the blocking devices work in the second working state, the code scanning devices are able to scan the identifications of the battery cells.

3. The method according to claim 2, wherein controlling, after the plurality of battery cells placed on the plurality of stations reach the designated code scanning positions, the blocking devices to work in the first working state according to the predetermined sequence, thereby blocking the identifications of the battery cells on the corresponding stations, comprises:

controlling, according to the predetermined sequence, the blocking devices one by one to switch from the second working state to the first working state; and controlling other blocking devices other than the blocking devices working in the first working state to maintain the second working state.

4. The method according to claim 1, wherein controlling, after the plurality of battery cells placed on the plurality of stations reach the designated code scanning positions, the blocking devices to work in the first working state according to the predetermined sequence, thereby blocking the identifications of the battery cells on the corresponding stations, comprises:

controlling, after the plurality of battery cells placed on the plurality of stations reach the designated code scanning positions, the code scanning devices to perform initial code scanning verification; and controlling, after passing the initial code scanning verification, the blocking devices to work in the first working state according to the predetermined sequence, thereby blocking the identifications of the battery cells on the corresponding stations.

5. The method according to claim 1, wherein determining, according to the code scanning results, whether the binding relationship between the code scanning devices and the stations is abnormal, comprises:

confirming, in response to the code scanning results being a first result, that the binding relationship between the code scanning devices and the stations is abnormal, the first result being a code scanning result that the code scanning devices corresponding to the blocking devices are able to scan codes normally while the blocking devices work in the first working state.

6. The method according to claim 5, wherein determining, according to the code scanning results, whether the binding relationship between the code scanning devices and the stations is abnormal, comprises:

confirming, in response to the code scanning results being a second result, that the binding relationship between the code scanning devices and the stations is normal, the second result being a code scanning result that the code scanning devices corresponding to the blocking devices are not able to scan codes normally while the blocking devices work in the first working state.

7. The method according to claim 5, further comprising:

issuing an alarm prompt in response to determining according to the code scanning results that the binding relationship between the code scanning devices and the stations is abnormal.

8. A computer device, comprising:

a processor, and a memory storing a computer program that, when executed by the processor, implements the method according to claim 1.

9. A non-transitory computer readable storage medium storing a computer program that, when executed by one or more processors, implements the method according to claim 1.

* * * * *